US008072446B2

(12) United States Patent
Chiang et al.

(10) Patent No.: US 8,072,446 B2
(45) Date of Patent: Dec. 6, 2011

(54) DISPLAY WITH POWER SAVING FUNCTION

(75) Inventors: Shao-Yang Chiang, Hsinchu (TW); Jin-Sheng Hsieh, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1063 days.

(21) Appl. No.: 11/936,088

(22) Filed: Nov. 7, 2007

(65) Prior Publication Data

US 2009/0027373 A1 Jan. 29, 2009

(30) Foreign Application Priority Data

Jul. 24, 2007 (TW) ............................... 96126885 A

(51) Int. Cl.
*G06F 3/038* (2006.01)
*G09G 5/00* (2006.01)

(52) U.S. Cl. ........................... 345/212; 345/87; 345/211

(58) Field of Classification Search ............ 345/87–100, 345/204, 211–213; 713/300, 320–323
See application file for complete search history.

(56) References Cited

U.S. PATENT DOCUMENTS 5,483,464 A * 1/1996 Song ............................ 713/300
6,078,361 A * 6/2000 Reddy .......................... 348/558
2006/0071896 A1* 4/2006 Nakata et al. .................. 345/94
2008/0059823 A1* 3/2008 Balatsos et al. ............... 713/323
2008/0273607 A1* 11/2008 Geile et al. .................... 375/260
2009/0006875 A1* 1/2009 Varma et al. ................. 713/320

FOREIGN PATENT DOCUMENTS

CN 1674082 9/2005

OTHER PUBLICATIONS

"1st Office Action of China counterpart application", issued on Oct. 30, 2009, p.1-p.6.

* cited by examiner

*Primary Examiner* — Kimnhung Nguyen
(74) *Attorney, Agent, or Firm* — Jianq Chyun IP Office

(57) ABSTRACT

A display and a driving control method for the display are provided. The display includes a display panel, a driving control module and a power-saving control module. The display panel is configured to display a plurality of frames. The driving control module is coupled to the display panel for providing a driving signal of each frame to the display panel. The power saving control module is coupled to the driving control module. The displaying period of each frame includes a first period and a second period. During the first period, the display enters a displaying mode. During the second period, the power-saving control module adjusts the operating parameters of the driving control module such that the display enters a power-saving mode. As a result, the power consumption of the display can be reduced.

7 Claims, 3 Drawing Sheets

DISPLAY WITH POWER SAVING FUNCTION

CROSS-REFERENCE TO RELATED APPLICATION

This application claims the priority benefit of Taiwan application serial no. 96126885, filed on Jul. 24, 2007. All disclosure of the Taiwan application is incorporated herein by reference.

BACKGROUND OF THE INVENTION

1. Field of the Invention

The present invention relates to a display driving control technology, and more particularly, to a driving control technology with power-saving function.

2. Description of Related Art

With the development of technology, displays have been very widely used. Based on the persistence of vision, when the display consecutively updates the images of the display panel such that more than twenty-four frames are presented per second, the human eye will be given an illusion that the displayed images are animated images. The time for the display to present one frame is usually referred to as one frame time, which is about 16.6 ms. The operation of the display to display the frames is further described below.

FIG. 1 illustrates conventional frame times in relation to the displaying control mode of a liquid crystal display (LCD). FIG. 2 illustrates the configuration of a conventional LCD. Operation of the LCD 10 to display frames is described below with reference to FIGS. 1 and 2. First, the image information of the frame 100 is transmitted from a timing controller 20 to a display data memory 30 according to timing. Then, the image information of the frame 100 stored in the display data memory 30 is converted into an analog voltage by a digital to analog converter 40. The analog voltage is then transmitted to corresponding transistors (not shown) of a display panel 60 by a source buffer 50.

During the period of displaying the frame 100 by the LCD 10, the timing controller 20 may also output a timing control signal to a gate buffer 70 to enable the gate buffer 70 to timely turn on the corresponding transistors (not shown) of the display panel 60. In addition, the timing controller 20 may also output a timing control signal to a common electrode buffer 80 to enable the common electrode buffer 80 to provide positive or negative common electrode voltage to the display panel 60. Operation of the LCD 10 to display other frames (i.e., frame 101 or the like) may be substantially the same as those described above and is therefore not repeated herein.

It should be noted that, during the period of displaying each frame, the LCD 10 is constantly in a displaying mode. In the displaying mode, all of the memory voltage $V_{SRAM}$, digital to analog converting voltage $V_{DAC}$, source voltage $V_{SP}$, common electrode high voltage $V_{COMH}$, common electrode low voltage $V_{COML}$, gate high voltage $V_{GH}$ and gate low voltage $V_{GL}$ are maintained at a fixed value. Furthermore, the oscillation frequency of the oscillator (not shown) inside the timing controller 20 is maintained at a fixed value. In other words, the conventional LCD 10 does not have a power-saving function during the displaying period of each frame.

SUMMARY OF THE INVENTION

The present invention is directed to a display with reduced power consumption.

The present invention is also directed to a driving control method for a display that can achieve a power-saving function.

The present invention provides a driving control method for a display comprising a driving control module. The driving control method comprises displaying a plurality of frames. The step of displaying each of the frames comprises, during a first period, entering a displaying mode of the display; and during a second period, entering a power-saving mode of the display by adjusting operating parameters of the driving control module.

According to an embodiment of the present invention, the step of entering the power-saving mode of the display by adjusting operating parameters of the driving control module comprises stopping providing an operating voltage or a bias current to at least one of a source buffer, a digital to analog converter, a common electrode buffer and a gate buffer of the display.

According to an embodiment of the present invention, the step of entering the power-saving mode of the display by adjusting operating parameters of the driving control module comprises decreasing an operating voltage or a bias current provided to at least one of a source buffer, a digital to analog converter, a common electrode buffer and a gate buffer of the display.

According to an embodiment of the present invention, the step of entering a power-saving mode of the display by adjusting operating parameters of the driving control module comprises decreasing the oscillation frequency of an oscillator of the display. In another embodiment, the display is configured to display at least twenty-four frames per second. In another embodiment, a power-consumption of the display is decreased with decreasing of the length ratio of the first period to the second period. In still another embodiment, the display is a hold-type display.

In another aspect, the present invention provides a driving control method for a display comprising a driving control module. The driving control method comprises, during a first period, entering a displaying mode of the display to display a first frame; during a second period, entering a power-saving mode of the display by adjusting operating parameters of the driving control module and maintaining the first frame; and during a third period, entering the displaying mode of the display to display a second frame.

According to an embodiment of the present invention, the length of the first period is the same as the length of the third period, and the ratio of the first period to the second period is a fixed value.

In another aspect, the present invention provides a display comprising a display panel, a driving control module and a power-saving control module. The display panel is configured to display a plurality of frames. The driving control module is coupled to the display panel and configured to provide a driving signal of each of the frames to the display panel. The power-saving control module is coupled to the driving control module. A displaying period of each of the frames comprises a first period and a second period. During the first period, the display enters a displaying mode to display a first frame, and during the second period, the power-saving control module adjusts operating parameters of the driving control module such that the display enters a power-saving mode.

According to an embodiment of the present invention, the power-saving control module decreases one of an operating voltage or a bias current provided to the driving control module when the display enters the power-saving mode. In another embodiment, the power-saving control module stops providing one of an operating voltage and a bias current to the driving control module when the display enters the power-saving mode. In another embodiment, the display further comprises a timing controller coupled to the driving control module and the power-saving control module, the timing controller configured to provide a timing control signal and a power-saving switch signal. In another embodiment, the timing controller comprises an oscillator configured to generate an operating frequency of the timing controller according to the power-saving switch signal. In still another embodiment, the oscillator decreases the operating frequency when the display enters the power-saving mode.

According to an embodiment of the present invention, the driving control module comprises a common electrode buffer, a gate buffer, a source buffer, a digital to analog converter and a display data memory. The common electrode buffer, the gate buffer and the source buffer are all coupled to the display panel, the timing controller and the power-saving control module. The digital to analog converter is coupled to the source buffer, the timing controller and the power-saving control module. The display data memory is coupled to the digital to analog converter, the timing controller and the power-saving control module.

According to an embodiment of the present invention, the power-saving control module comprises first, second and third power switches. The first power switch is coupled to the common electrode buffer and configured to output one of a common electrode high voltage or a common electrode low voltage to the common electrode buffer according to the power-saving switch signal and the timing control signal. The second power switch is coupled to the source buffer and configured to determine whether to provide a source voltage to the source buffer according to the power-saving switch signal. The third power switch is coupled to the digital to analog converter and configured to determine whether to provide a digital-to-analog converting voltage to the digital to analog converter according to the power-saving switch signal.

A first power regulator is coupled to the display data memory. The first power regulator is configured to provide a memory voltage to the display data memory and to determine whether to decrease the memory voltage according to the power-saving switch signal. A second power regulator is coupled to the gate buffer. The second power regulator is configured to provide one of the gate high voltage and the gate low voltage to the gate buffer and to determine whether to decrease the one of a gate high voltage and a gate low voltage according to the power-saving switch signal and the timing control signal.

The display of the present invention displays multiple frames, and the displaying period of each frame includes a first period and a second period. During the first period, the display enters a displaying mode. During a second period, the display enters a power-saving mode by adjusting operating parameters of a driving control module. As a result, the power consumption of the display can be significantly reduced.

In order to make the aforementioned and other features and advantages of the present invention more comprehensible, embodiments accompanied with figures are described in detail below.

DESCRIPTION OF THE EMBODIMENTS

Conventionally, the display is always in a displaying mode during a frame is being displayed and therefore has a high power consumption. To solve this problem, in the embodiments of the present invention, the displaying period of each frame is divided into a first period and a second period. During the first period, the display enters a displaying mode to display the frame. The display enters a power-saving mode by adjusting operating parameters of a driving control module during the second period, and the display maintains the displayed frame during the second period. As such, the power consumption of the display can be significantly reduced. The configuration of the display is described below in greater detail.

Figure 1:
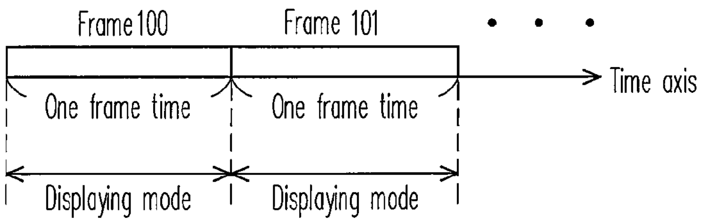
FIG. 1 (PRIOR ART)
FIG. 1 illustrates conventional frame times in relation to the displaying control mode of a liquid crystal display.
Figure 2:
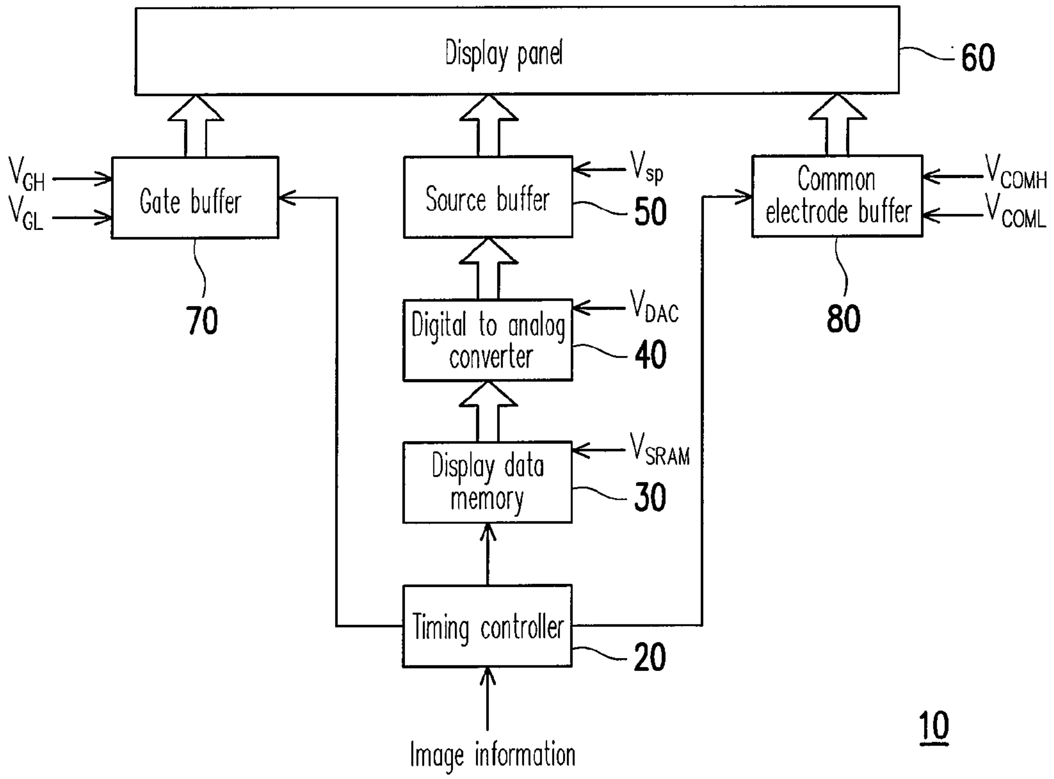
FIG. 2 (PRIOR ART)
FIG. 2 illustrates the configuration of a conventional liquid crystal display.
Figure 3:
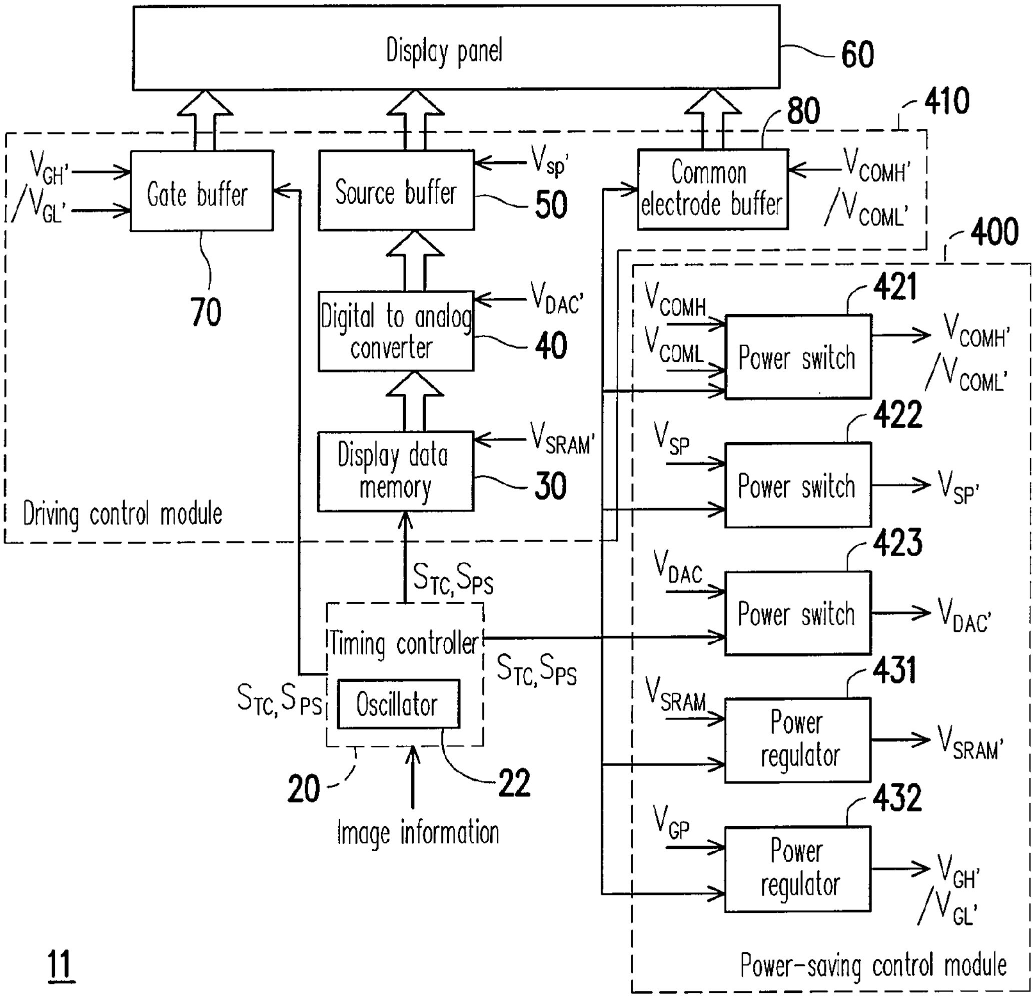
FIG. 3 illustrates the configuration of a display in accordance with an embodiment of the present invention.

FIG. 3 illustrates the configuration of a display in accordance with an embodiment of the present invention. Referring to FIG. 3, the display of the present embodiment includes a display panel 60, a driving control module 410, a power-saving control module 400 and a timing controller 20. In the present invention, the display is implemented as, for example, a liquid crystal display (LCD) 11. In an alternative embodiment, the display could be other types of hold-type displays.

The display panel 60 is used to display a plurality of frames. The driving control module 410 is coupled to the display panel 60, for providing a driving signal of each frame to the display panel 60. The power-saving control module 400 is coupled to the driving control module 410 to adjust operating parameters of the driving control module 410. Specifically, the power-saving control module 400 is used to control or adjust an operating voltage or a bias current that is provided to various devices of the driving control module 410. The timing controller 20 is coupled to the driving control module 410 and the power-saving control module 400, for providing a timing control signal $S_{TC}$ and a power-saving switch signal $S_{PS}$. The timing control signal $S_{TC}$ is used to control operation timing of various devices of the LCD 11 to match the timing of displaying each frame. The power-saving switch signal $S_{PS}$ is used to control the LCD 11 to enter the displaying mode or the power-saving mode. The timing controller 20 includes an oscillator 22. The oscillation frequency of the oscillator 22 may be used as the operation frequency of the timing controller 20 and may be adjusted according to the power-saving signal $S_{PS}$.

The driving control module 410 includes a common electrode buffer 80, a gate buffer 70, a source buffer 50, a digital to analog converter 40 and a display data memory 30.

On the other hand, the power-saving control module 400 includes power switches 421, 422 and 423 and power regulators 431 and 432. When the LCD 11 enters the power-saving mode, the power-saving control module 400 may stop supplying the operation voltages or bias currents to parts of the devices of the driving control module 410, or adjust the operation voltages or bias currents provided to the part of the devices of the driving control module 410, thereby reducing the power consumption of the LCD 11.

The power switch 421 is coupled to the common electrode buffer 80 to receive the common electrode high and low voltage $V_{COMH}$ and $V_{COML}$, and may determine whether to output the common electrode high voltage $V_{COMH}$ or the common electrode low voltage $V_{COML}$ to the common electrode buffer 80 according to the signals $S_{PS}$ and $S_{TC}$. The power switch 422 is coupled to the source buffer 50 to receive the source voltage $V_{SP}$, and may determine whether to output the voltage $V_{SP}$ to the source buffer 50 according to the signal $S_{PS}$. The power switch 423 is coupled to the digital to analog converter 40 to receive the digital-to-analog converting voltage $V_{DAC}$, and may determine whether to output the voltage $V_{DAC}$ to the digital to analog converter 40 according to the signal $S_{PS}$.

The power regulator 431 is coupled to the display data memory 30 to receive the memory voltage $V_{SRAM}$, and may determine whether to adjust the memory voltage $V_{SRAM}$ of the display data memory 30 according to the signal $S_{PS}$. The power regulator 432 is coupled to the gate buffer 70 to receive the voltage $V_{GP}$, and may supply the gate high voltage $V_{GH}$ or the gate low voltage $V_{GL}$ to the gate buffer 70 according to the signal $S_{PS}$. The operation of the LCD 11 is described below in greater detail.

Figure 4:
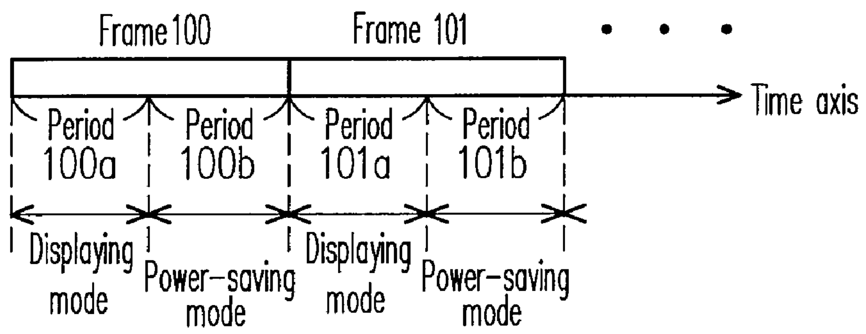
FIG. 4 illustrates frame times in relation to the displaying control mode of the display in accordance with an embodiment of the present invention.
Figure 5:
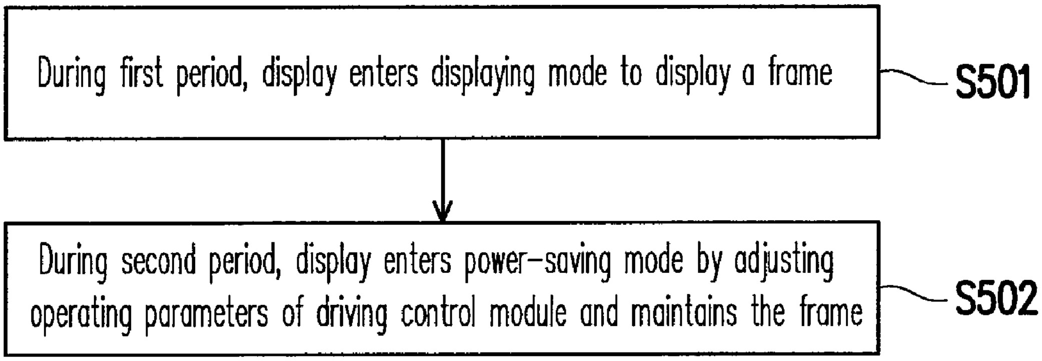
FIG. 5 is a flow chart of a driving control method for the display in accordance with an embodiment of the present invention.

FIG. 4 illustrates frame times in relation to the displaying control mode of the display in accordance with an embodiment of the present invention. FIG. 5 is a flow chart of a driving control method for the display in accordance with an embodiment of the present invention. Referring to FIGS. 3, 4 and 5, in this embodiment, it is assumed that one frame time is 16.6 ms, and the displaying period of each frame is divided into a first period (referred to as period 100*a*) and a second period (referred to as period 100*b*). In addition, in this embodiment, each of the period 100*a* and period 100*b* has a length of 8.3 ms. In an alternative embodiment, however, the length ratio of the period 100*a* to the period 100*b* may vary according to various requirements. The power consumption of the LCD 11 is decreased with decreasing of the length ratio.

Displaying of the frame 100 by the LCD 11 is described first below. First, during period 100*a*, the LCD 11 enters the displaying mode (S501). In the displaying mode, the scan frequency of the LCD 11 may be increased such that the scan action of the frame 100 is completed during the period 100*a*.

The timing controller 20 may output the image information of the frame 100 to the display data memory 30 according to the timing. Afterwards, the digital to analog converter 40 converts the image information of the frame 100 stored in the display data memory 30 into an analog voltage. The source buffer 50 then outputs the voltage into corresponding transistors (not shown) of the display panel 60.

Besides, during the period 100*a*, the timing controller 20 may also output the signal $S_{TC}$ to the gate buffer 70, so that the gate buffer 70 can timely turn on corresponding transistors (not shown) of the display panel 60, allowing the corresponding transistors to receive the analog voltage outputted from the source buffer 50. In addition, the timing controller 20 may also output the signal $S_{TC}$ to the common electrode buffer 80, so that the common electrode buffer 80 can provide positive or negative common electrode voltage to the display panel 60 for polarity inversion. With the cooperative operation of the devices described above, the display panel 60 can display the frame 100.

It should be noted that, during the period 100*b*, the operating parameters of the driving control module 410 may be adjusted by the power-saving control module 400 so that the LCD 11 enters the power-saving mode (step S502). Generally speaking, the penetrability of the liquid crystal (not shown) light valve of the display panel 60 is usually controlled by voltage. In other words, the liquid crystal light valve of the display panel 60 will maintain its previous penetrability when no control voltage is received. Thus, even if the LCD 11 enters the power-saving mode during the period 100*b*, the display panel 60 can maintain the frame 100 without significantly affecting the image quality.

During the power-saving mode, the power switch 421 may selectively switch off one of the voltage $V_{COMH'}$ and $V_{COML'}$ according to polarity of the signal $S_{TC}$. Specifically, when the signal $S_{TC}$ is positive, the display panel 60 needs only the voltage $V_{COMH'}$, and the voltage $V_{COML'}$ can be turned off. On the contrary, when the signal $S_{TC}$ is negative, the display panel 60 needs only the voltage $V_{COML'}$, and the voltage $V_{COMH'}$ can be turned off.

In addition, the source buffer 50 and the digital to analog converter 40 need not provide the image information of the frame 100 to the display panel 60, and the gate buffer 70 need not switch on or off the transistors of the display 60 during the power-saving mode. Therefore, the power switch 422 may stop providing the voltage $V_{SP}$ to the source buffer 50, the power switch 423 may stop providing the voltage $V_{DAC}$ to the digital to analog converter 40, and the power regulator 432 may stop providing the voltage $V_{GH}$ and decrease the voltage $V_{GL'}$.

Further, during the power-saving mode, the oscillator 22 may lower the operating frequency of the timing controller 20, and the power regulator 431 may also decrease the voltage $V_{SRAM}$ to the display data memory 30, so that the timing controller 20 can pre-store the frame 101 into the display data memory 30. It should be understood that those skilled in the art would be able to understand operation of the LCD 11 to display the frame 101 and later frames as described above with respect to the displaying of the frame 100 and, thus, the displaying of the frame 101 and later frames is not repeated herein.

Compared to the prior art, the embodiment of the present invention increases the scan frequency so as to complete the scan action of the frame 100 during the period 100*a*. As a result, the voltage or current provided to the driving control module 410 can be decreased or turned off during the period 100*b*, thereby significantly reduce the power consumption of the LCD 11. In addition, one frame time of the embodiment of the present invention is the same as that of the prior art and, therefore, the display of the embodiment of the present invention can also display twenty-four or more frames per second. That is to say, the embodiment of the present invention can also ensure the fluency of the images.

A possible embodiment of the display and the driving control method are described above. It should be understood, however, that the design of the display and the driving control method could vary with different companies and, thus, the present invention should not be limited to the possible embodiment described above. In other words, the display may be implemented in another form as long as the display can enter the displaying mode during a first period to display a frame and can enter a power-saving mode during a second period by adjusting operating parameters of the driving control module to maintain the displayed frame. More examples are described below to comprehensively illustrate the present invention.

For example, in the power-saving mode, it should be understood that the present invention may decrease or stop providing the operating voltage or bias current to other devices of the display. Examples of the other devices include, but are not limited to, a shift register, level shifter, digital buffer, or the like.

In addition, though the displaying period of each frame is divided into first and second periods, it should be understood, however, that the displaying period of each frame could be divided into multiple periods such that the displaying mode and power-saving mode are alternately arranged.

In summary, during a first period of displaying a frame, the display of the present invention enters a displaying mode. During a second period of displaying the frame, the display enters a power-saving mode by adjusting operating parameters of a driving control module. As a result, the power consumption of the display can be significantly reduced. In addition, the present invention has at least the following advantages.

1. In the power-saving mode, the power-saving control module is operable to decrease the operating voltage or bias current provided to the devices of the driving control module, thereby significantly reducing the power consumption without influencing the image quality.

2. In the power-saving mode, the power-saving control module is operable to stop providing the operating voltage or bias current to the devices of the driving control module, thereby ensuring the image quality as usual, and also significantly reducing the power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display, comprising:

a display panel configured to display a plurality of frames;

a driving control module, coupled to the display panel, the driving control module being configured to provide a driving signal of each of the frames to the display panel;

a power-saving control module, coupled to the driving control module; and a timing controller, coupled to the driving control module and the power-saving control module, the timing controller being configured to provide a timing control signal and a power-saving switch signal, wherein a displaying period of each of the frames comprises a first period and a second period, during the first period, the display enters a displaying mode to display a first frame, and during the second period, the power-saving control module adjusts operating parameters of the driving control module such that the display enters a power-saving mode, and wherein the driving control module comprises a common electrode buffer, coupled to the display panel, the timing controller and the power-saving control module;

a gate buffer, coupled to the display panel, the timing controller and the power-saving control module;

a source buffer, coupled to the display panel, the timing controller and the power-saving control module;

a digital to analog converter, coupled to the source buffer, the timing controller and the power-saving control module; and a display data memory, coupled to the digital to analog converter, the timing controller, and the power-saving control module.

2. The display of claim 1, wherein the power-saving control module decreases one of an operating voltage or a bias current provided to the driving control module when the display enters the power-saving mode.

3. The display of claim 1, wherein the power-saving control module stops providing one of an operating voltage and a bias current to the driving control module when the display enters the power-saving mode.

4. The display of claim 1, wherein the power-saving control module comprises:

a first power switch, coupled to the common electrode buffer, configured to output one of a common electrode high voltage or a common electrode low voltage to the common electrode buffer according to the power-saving switch signal and the timing control signal;

a second power switch, coupled to the source buffer, configured to determine whether to provide a source voltage to the source buffer according to the power-saving switch signal;

a third power switch, coupled to the digital to analog converter, configured to determine whether to provide a digital-to-analog converting voltage to the digital to analog converter according to the power-saving switch signal;

a first power regulator, coupled to the display data memory, configured to provide a memory voltage to the display data memory and to determine whether to decrease the memory voltage according to the power-saving switch signal; and a second power regulator, coupled to the gate buffer, configured to provide one of a gate high voltage and a gate low voltage to the gate buffer and to determine whether to decrease the one of the gate high voltage and the gate low voltage according to the power-saving switch signal and the timing control signal.

5. The display of claim 1, wherein the timing controller comprises an oscillator configured to generate an operating frequency of the timing controller according to the power-saving switch signal.

6. The display of claim 5, wherein the oscillator decreases the operating frequency when the display enters the power-saving mode.

7. The display of claim 1, wherein the display is a hold-type display.

* * * * *